United States Patent
Shen et al.

(10) Patent No.: US 9,620,284 B2
(45) Date of Patent: Apr. 11, 2017

(54) METHOD TO ASSEMBLE COIL AND ELASTIC PLATE OF VOICE COIL MOTOR ASSEMBLY

(71) Applicants: Wenchen Shen, Xiamen (CN); Chengyang Wu, Xiamen (CN); Shanmu Liu, Xiamen (CN); Jianlong Zhang, Xiamen (CN); Huangjie Lu, Xiamen (CN); Fang Huang, Xiamen (CN)

(72) Inventors: Wenchen Shen, Xiamen (CN); Chengyang Wu, Xiamen (CN); Shanmu Liu, Xiamen (CN); Jianlong Zhang, Xiamen (CN); Huangjie Lu, Xiamen (CN); Fang Huang, Xiamen (CN)

(73) Assignee: XIAMEN XINHONGZHOU PRECISION TECHNOLOGY CO., LTD., Xiamen, Fujian (CN)

( * ) Notice: Subject to any disclaimer, the term of this patent is extended or adjusted under 35 U.S.C. 154(b) by 232 days.

(21) Appl. No.: 14/273,443

(22) Filed: May 8, 2014

(65) Prior Publication Data

US 2015/0128407 A1 May 14, 2015

(30) Foreign Application Priority Data

Nov. 13, 2013 (CN) .......................... 2013 1 0571080

(51) Int. Cl.
*H01F 41/06* (2016.01)
*B23K 26/21* (2014.01)
(Continued)

(52) U.S. Cl.
CPC ............. *H01F 41/06* (2013.01); *B23K 26/20* (2013.01); *B23K 26/21* (2015.10); *H01F 41/074* (2016.01);
(Continued)

(58) Field of Classification Search
CPC ...... H01F 41/06; H01F 41/074; H01F 41/076; H02K 41/0354; H02K 41/0356;
(Continued)

(56) References Cited

U.S. PATENT DOCUMENTS 4,785,527 A * 11/1988 Bernard .................. H01F 41/10
242/440
6,138,344 A * 10/2000 Roessler ........... Y10T 29/49073
29/606
(Continued)

FOREIGN PATENT DOCUMENTS

JP          60176448 A * 9/1985

*Primary Examiner* — A. Dexter Tugbang

(57) ABSTRACT

An assembling method of a coil and an elastic plate of a voice coil motor assembly includes step 1: winding a coil around a support body of a coil support of a sleeve having an upper flange and a lower flange, and the support body disposed between the upper flange and the lower flange, an outer edge of the upper flange having at least two opposing protrusions; step 2: installing two opposing lower elastic plates on an upper surface of the support through an automation apparatus, two opposing lower elastic plates being respectively stacked above the two opposing protrusions; step 3: placing the support stacked with the lower elastic plates in a welding apparatus, contact positions of the two lower elastic plates and the two protrusions being an area of contact positions of the lower elastic plates; and step 4: soldering tin on the solder paste or fixing by laser welding.

8 Claims, 4 Drawing Sheets

(51) Int. Cl.
  *H01F 41/074*   (2016.01)
  *H02K 41/035*   (2006.01)
  *H01F 41/076*   (2016.01)
  *B23K 26/20*    (2014.01)

(52) U.S. Cl.
  CPC ....... *H01F 41/076* (2016.01); *H02K 41/0354* (2013.01); *H02K 41/0356* (2013.01); *Y10T 29/4902* (2015.01); *Y10T 29/49071* (2015.01); *Y10T 29/49073* (2015.01)

(58) Field of Classification Search
  CPC ..... B23K 26/20; B23K 26/21; Y10T 29/4902; Y10T 29/49071; Y10T 29/49073
  See application file for complete search history.

(56) References Cited

U.S. PATENT DOCUMENTS

| | | | |
|---|---|---|---|
| 7,663,818 B2* | 2/2010 | Chung | H02K 41/0356 359/814 |
| 2005/0054952 A1* | 3/2005 | Eskuri | B23K 26/20 600/585 |
| 2007/0075054 A1* | 4/2007 | Nakamura | B23K 26/20 219/121.61 |

* cited by examiner

METHOD TO ASSEMBLE COIL AND ELASTIC PLATE OF VOICE COIL MOTOR ASSEMBLY

BACKGROUND OF THE INVENTION

1. Field of the Invention

The present invention relates to a manufacturing method of a voice coil motor assembly, and more particularly to a method to assemble a coil and an elastic plate of a voice coil motor assembly.

2. Description of the Prior Art

A voice coil motor assembly is adapted to as a short-distance drive device of an electronic product, such as a cell phone, a digital camera, and the like.

A conventional voice coil motor assembly comprises an immovable unit disposed in a casing and a movable unit which is fitted on the immovable member and is movable relative to the immovable member. The immovable unit comprises an elastic plate, a magnetic member, and a spacer to fix the magnetic member. The movable unit comprises a support and a coil wound on the support. As shown in FIG. 1, the contact way of a coil 6' and an elastic plate 7' of the conventional voice coil motor assembly is a manual process. After the coil 6' is wound on a support 5', the head end and the tail end of the coil may slant. It is necessary to adjust and draw out the ends of the coil manually after winding for the elastic plate 7' on the support 5' to be soldered manually. Therefore, the process to assemble the coil 6' and the elastic plate 7' is quite complicated. Subject to the manual process, it requires much time and work for assembly. The manufacture cost is high. Besides, the welding of the ends of the coil and the elastic plate 7' is in the way of thread-surface contact. The welding area is less. When the product is tested for strength or rolling or is assembled in an electronic product, the ends of the coil may disconnect from the welding position to influence the quality of the product. Accordingly, the inventor of the present invention has devoted himself based on his many years of practical experiences to solve this problem.

SUMMARY OF THE INVENTION

The primary object of the present invention is to provide a method to assemble a coil and an elastic plate of a voice coil motor assembly, without the need to assemble the coil and the elastic plates manually, to enhance the production efficiency greatly and to enhance the connection of the coil and the elastic plates so as to ensure the quality of the product.

In order to achieve the aforesaid object, the method to assemble a coil and elastic plates of a voice coil motor assembly, comprising the steps of:

step 1: winding the coil on a coil support, the coil support being a sleeve, the coil support having an upper flange and a lower flange at upper and lower ends thereof, and a support body between the upper flange and the lower flange for the coil to be wound thereon, an outer edge of the upper flange having at least two opposing protrusions, the coil having a head end and a tail end which are respectively wound on the two opposing protrusions;

step 2: installing the two opposing lower elastic plates on an upper surface of the coil support through an automation apparatus, the two opposing lower elastic plates being respectively stacked on the two opposing protrusions of the coil support;

step 3: placing the coil support stacked with the lower elastic plates in a welding apparatus, contact positions of the lower elastic plates and the two protrusions being contact positions of the lower elastic plates and the coil for proceeding with solder paste; and step 4: soldering tin on the solder paste or fixing by laser welding to assemble the coil and the elastic plates of the voice coil motor assembly.

Preferably, the laser welding in step 4 adopts a phased temperature control to proceed with welding.

Preferably, the phased temperature control includes two phase temperatures, a first phase temperature of 0-170° C. and a second phase temperature of above 240° C.

Preferably, the solder paste of the laser welding in step 4 is applied to the position to be welded, with a CCD (charge coupled device) camera to scan the area and the position of the solder paste. After scanning, the laser welding adopts the phased temperature control.

Preferably, after step 1, the coil support wound with the coil is installed into a jig. The upper surface the coil support is applied with glue. After that, the two opposing lower elastic plates are installed on the upper surface of the coil support through an automation apparatus. The two opposing lower elastic plates are respectively stacked on the two opposing protrusions of the coil support to proceed with roast and prefixing. The coil support with the prefixed lower elastic plates is taken out and placed in a welding apparatus for proceeding with solder paste.

Preferably, the laser welding in step 4 adopts a phased temperature control to proceed with welding.

Preferably, the phased temperature control includes two phase temperatures, a first phase temperature of 0-170° C. and a second phase temperature of above 240° C.

Preferably, the solder paste of the laser welding in step 4 is applied to the position to be welded, with a CCD (charge coupled device) camera to scan the area and the position of the solder paste. After scanning, the laser welding adopts the phased temperature control.

The voice coil motor assembly of the present invention comprises the coil support wound with the coil is provided with two opposing protrusions. When the coil is wound on the coil support, it can be first wound on one protrusion and positioned thereon to prevent the head end from slanting, and then wound around the support body. It is not necessary to draw out the ends of the coil manually like the prior art. Simultaneously, the tail end is wound on the other protrusion. The process to assemble the coil and the elastic plates is simple so as to lower the cost effectively. The lower elastic plates are mounted on the coil support through the operation of the automation apparatus to be soldered with the coil wound on the protrusions. This achieves the welding assembly of the automation apparatus to enhance the production efficiency greatly. The contact area of the coil wound on the protrusions and the lower elastic plates is great, so the connection of the coil and the lower elastic plates is firm, without the problem of disconnection, to ensure the quality of the product of the voice coil motor assembly.

Besides, it can adopt voice laser phased welding, without stripping process of the enameled wire to save the manufacture process, and it can prevent the problem of soldering tin overflow, to enhance the quality of the voice coil motor assembly.

DETAILED DESCRIPTION OF THE PREFERRED EMBODIMENTS

Embodiments of the present invention will now be described, by way of example only, with reference to the accompanying drawings.

Figure 1:
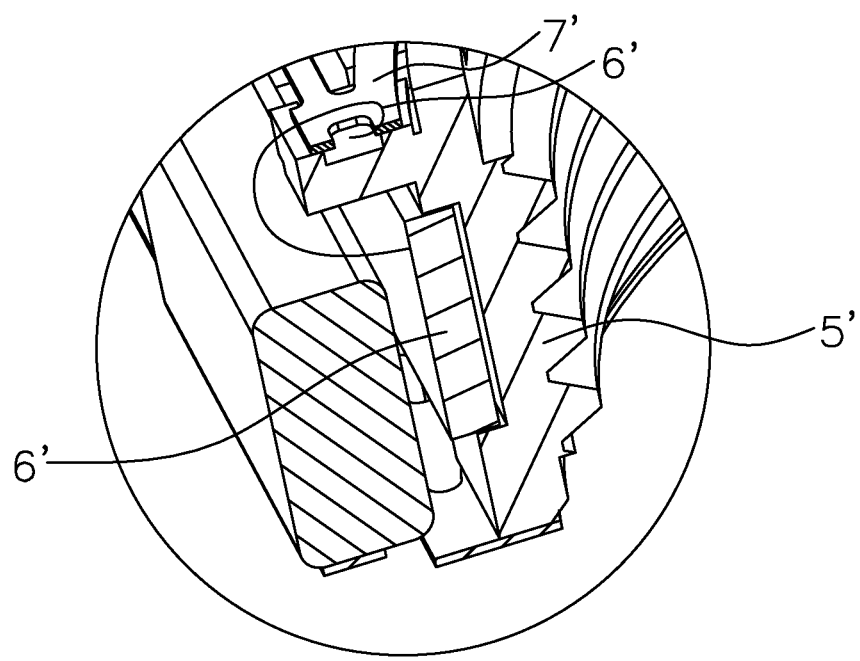
FIG. 1 is a sectional view showing the assembly of the coil and the elastic plate of a conventional voice coil motor assembly.
Figure 2:
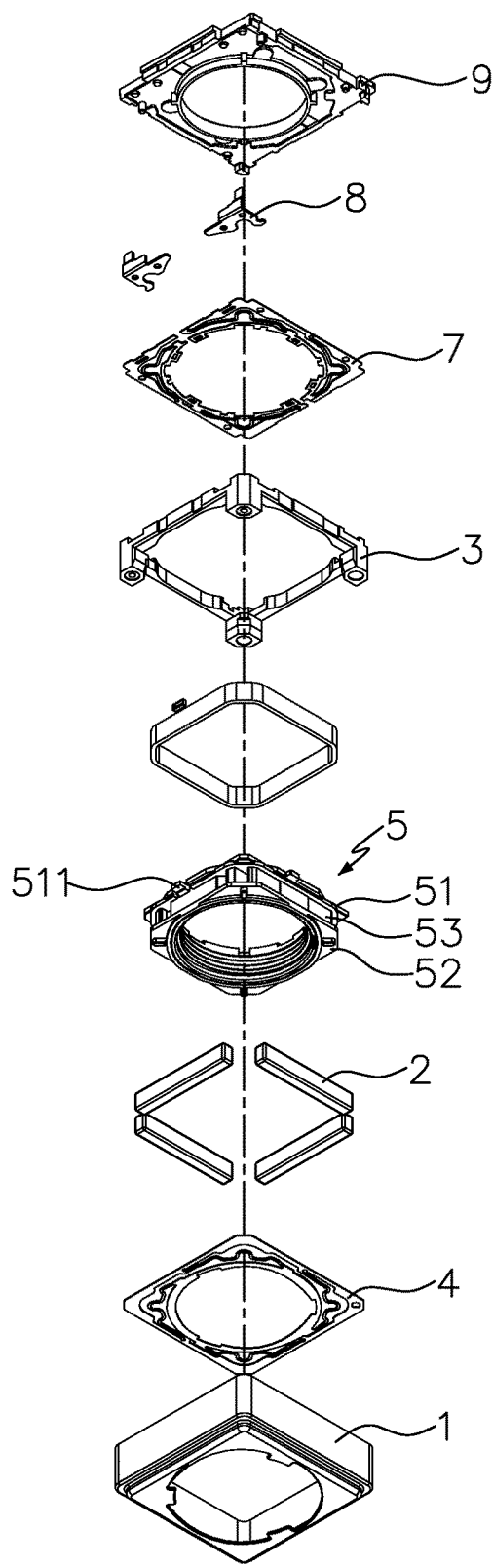
FIG. 2 is an exploded view according to a preferred embodiment of the present invention.
Figure 3:
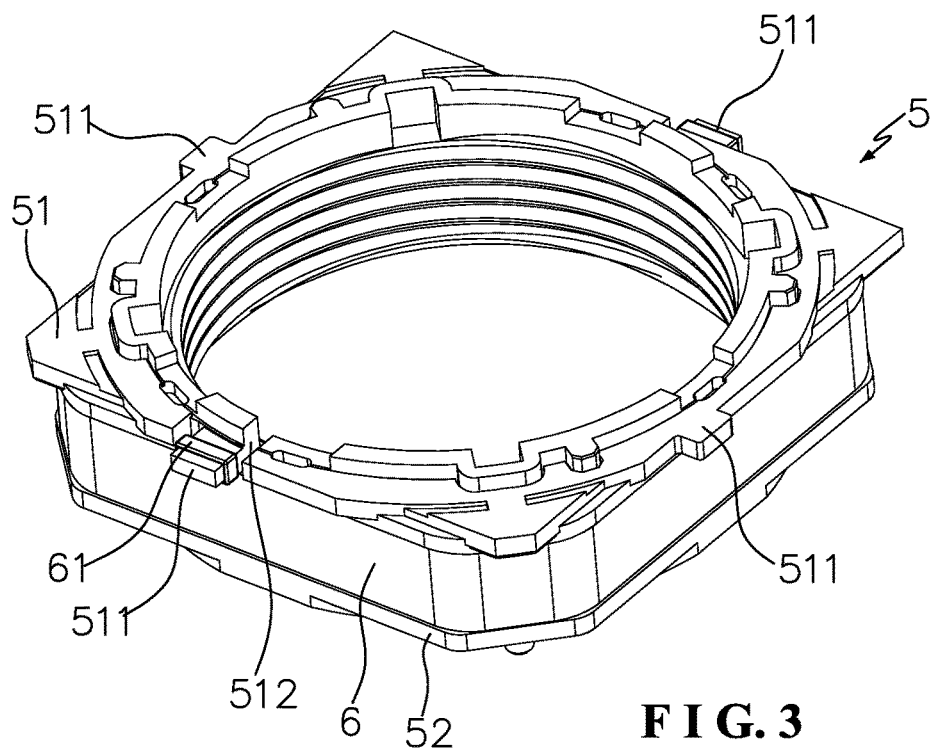
FIG. 3 is a perspective view showing the coil support according to the preferred embodiment of the present invention.
Figure 4:
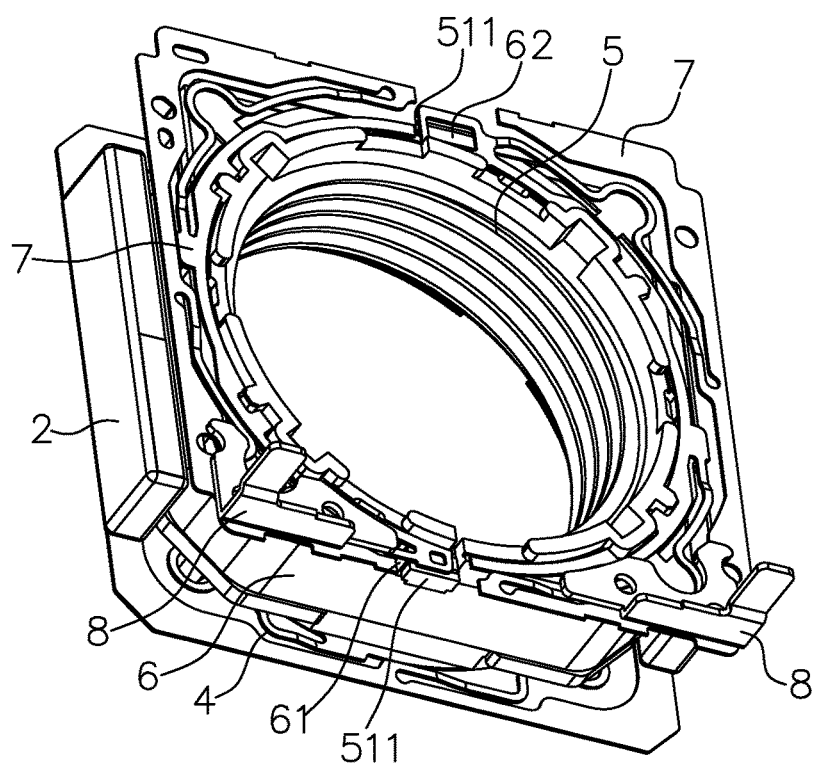
FIG. 4 is a perspective view showing the coil support and the elastic plates according to the preferred embodiment of the present invention.
Figure 5:
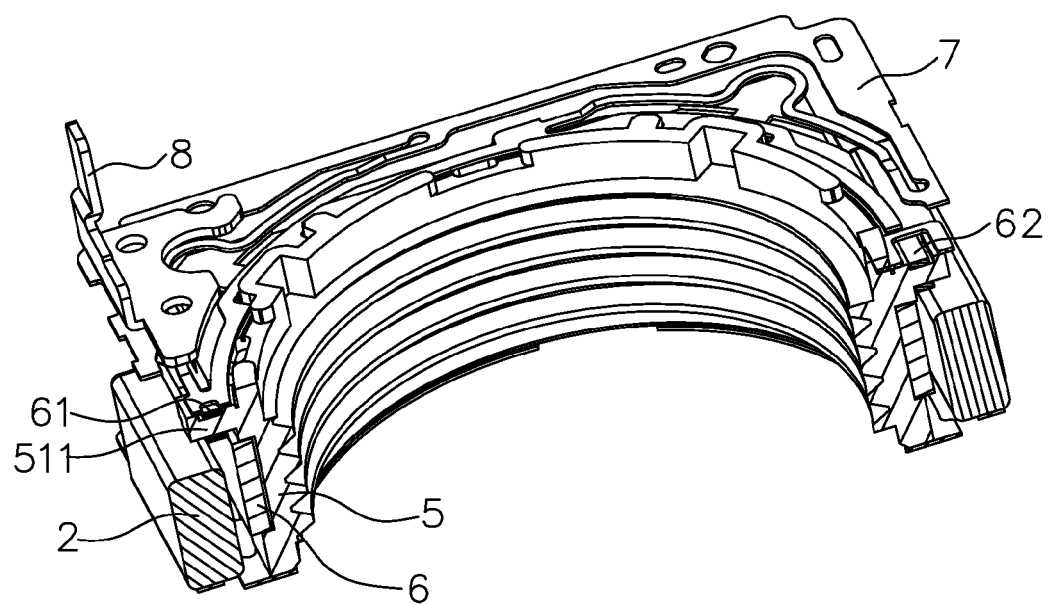
FIG. 5 is a sectional view showing the coil and the elastic plates according to the preferred embodiment of the present invention.

As shown in FIG. 2 to FIG. 5, the present invention discloses a voice coil motor assembly. The voice coil motor assembly according to a preferred embodiment of the present invention comprises a casing 1, a magnetic member 2, a spacer 3 to fix the magnetic member 2, an upper elastic plate 4 to match with the spacer 3, a coil support 5, a coil 6 wound on the coil support 5, and two opposing lower elastic plates 7 disposed on the coil support 5. The two lower elastic plates 7 and a terminal 8 are welded together and then fixed on an upper cover 9. The outer wall of the upper elastic plate 4, the magnetic member 2, the spacer 3, and the outer walls of the two lower elastic plates 7 constitute an immovable unit. The coil support 5 wound with the coil 6, the inner walls of the two lower elastic plates 7, and the inner wall of the upper elastic plate 4 constitute a movable unit. The casing 1 and the upper cover 9 form a chamber to accommodate the aforesaid parts.

The coil support 5 is a sleeve which can be a square, circle, or a polygon. The coil support 5 has an upper flange 51 and a lower flange 52 at upper and lower ends thereof, and a support body 53 between the upper flange 51 and the lower flange 52 for the coil 6 to be wound thereon. The outer edge of the upper flange 51 has at least two opposing protrusions 511 which are arranged radially. The coil 6 has a head end 61 and a tail end 62 which are respectively wound on the two opposing protrusions 511. The two lower elastic plates 7 are respectively connected with the coil wound on the two protrusions 511 by welding.

In this embodiment, the coil support 5 is a square sleeve. Four sides of the coil support 5 are provided with one protrusion 511, respectively. The protrusions 511 of the four sides are arranged evenly to achieve a balance.

The bottom of one of the protrusions 511 is formed with a notch 512. The bottom of the notch 512 is flush with the support body 53. The protrusion 511 having the notch 512 is to form a start position for the coil 6 to be wound on the coil support 5. When the coil 6 is wound, the head end 61 of the coil 6 is first wound on the protrusion 511 in a loop or several loops and then positioned to prevent the head end 61 from slanting, and then wound around the support body 53. Through the notch 512, the coil 6 can tightly lean against the support body 53 when the coil 6 is wound around the support body 53 so as to ensure the tightness of the coil 6. After the coil 6 is completely wound, the tail end 62 can be wound on the other protrusion 511 opposite the protrusion 511 wound with the head end 61. The tail end 62 of the coil 6 can be wound on the other protrusion 511 in a loop or several loops to be fixed thereon.

The steps to assemble the coil and the elastic plates of the voice coil motor assembly of the present invention are as follows:

step 1: the coil 6 is wound on the coil support 5, and the head end 61 and the tail end 62 of the coil 6 are respectively wound on the two opposing protrusions 511 of the coil support 5;

step 2: the coil support 5 wound with the coil 6 is installed into a jig, and the upper surface the coil support 5 is applied with glue for fixing the lower elastic plates 7;

step 3: the two opposing lower elastic plates 7 are installed on the upper surface of the coil support 5 through an automation apparatus, and the two opposing lower elastic plates 7 are respectively stacked on the two opposing protrusions 511 of the coil support 5 to proceed with roast and prefixing;

step 4: the coil support 5 with the prefixed lower elastic plates 7 is taken out and placed in a welding apparatus, the contact positions of the lower elastic plates 7 and the two protrusions 511 are the contact positions of the lower elastic plates 7 and the coil 6 for proceeding with solder paste; and step 5: the solder paste is soldered with soldering tin or fixed by laser welding to assemble the coil and the elastic plates of the voice coil motor assembly.

The step 2 can be omitted, and then there is no need to proceed with roast in Step 2. The coil support 5 with the stacked lower elastic plates 7 is to proceed with solder paste direct.

In step 5, the laser welding won't have the problem of soldering tin overflow. When welding, the solder paste is applied to the position to be welded, with a CCD (charge coupled device) camera to scan the area and the position of the solder paste. After the scan is completed, the welding adopts a phased temperature control.

The phased temperature control includes two phase temperatures, a first phase temperature of 0-170° C. and a second phase temperature of above 240° C. In the first phase temperature, the temperature is slowly raised by using continuous light to gasify the rosin slowly. At the same time, the enamel on the surface of the enameled wire is removed, without manual stripping process to save the manufacture process. In the second phase temperature, the temperature is raised high instantaneously by using pulsed light to liquidize tin beads so as to complete the welding operation.

To sum up, the voice coil motor assembly of the present invention comprises the coil support 5 wound with the coil 6 is provided with two opposing protrusions 511. When the coil 6 is wound on the coil support 5, it can be first wound on one protrusion 511 and positioned thereon to prevent the head end 61 from slanting, and then wound around the support body 53. It is not necessary to draw out the ends of the coil manually like the prior art. Simultaneously, the tail end 62 is wound on the other protrusion 511. The process to assemble the coil and the elastic plates is simple to lower the cost effectively. The lower elastic plates 7 are mounted on the coil support 5 through the operation of the automation apparatus to be soldered with the coil wound on the protrusions 511. This achieves the welding assembly of the automation apparatus to enhance the production efficiency greatly. The contact area of the coil wound on the protrusions 511 and the lower elastic plates 7 is great, so the connection of the coil and the lower elastic plates 7 is firm, without the problem of disconnection, to ensure the quality of the product of the voice coil motor assembly.

Furthermore, it can adopt voice laser phased welding, preventing the problem of soldering tin overflow, to enhance the quality of the voice coil motor assembly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method to assemble a coil and elastic plates of a voice coil motor assembly, comprising the steps of:
    step 1: winding the coil around a support body on a coil support, the coil support being a sleeve, the coil support having an upper flange and a lower flange at upper and lower ends thereof, and the support body between the upper flange and the lower flange for the coil to be wound thereon, an outer edge of the upper flange having at least two opposing protrusions, radially opposed to each other and protruding in a radial direction, the coil having a head end and a tail end which are respectively wound in one or more loops perpendicular to the radial direction on the two opposing protrusions;
    step 2: installing the two opposing lower elastic plates on an upper surface of the coil support through an automation apparatus, the two opposing lower elastic plates being respectively stacked above the two opposing protrusions of the coil support;
    step 3: placing the coil support stacked with the lower elastic plates in a welding apparatus, contact positions between the two lower elastic plates and the two protrusions being an area formed by the one or more loops of the coil for proceeding with solder paste; and
    step 4: soldering tin on the solder paste or fixing by laser welding to assemble the coil and the elastic plates of the voice coil motor assembly.

2. The method of claim 1, wherein the laser welding adopts a phased temperature control.

3. The method of claim 2, wherein the phased temperature control includes two phase temperatures, a first phase temperature of 0-170° C. and a second phase temperature of above 240° C.

4. The method of claim 2, wherein the solder paste of the laser welding is applied with a Charge Coupled Device (CCD) camera to scan the area and the contact position of the solder paste, after scanning, the laser welding adopting the phased temperature control.

5. The method of claim 1, wherein, the coil support wound with the coil is installed into a jig, the upper surface the coil support being applied with glue; after that, the two opposing lower elastic plates being installed on the upper surface of the coil support through the automation apparatus, the two opposing lower elastic plates being respectively stacked on the two opposing protrusions of the coil support to proceed with roast and prefixing; the coil support with the prefixed lower elastic plates being taken out and placed in the welding apparatus for proceeding with the solder paste.

6. The method of claim 5, wherein the laser welding adopts a phased temperature control.

7. The method of claim 6, wherein the phased temperature control includes two phase temperatures, a first phase temperature of 0-170° C. and a second phase temperature of above 240° C.

8. The method of claim 6, wherein the solder paste of the laser welding is applied with a Charge Coupled Device (CCD) camera to scan the area and the contact position of the solder paste, after scanning, the laser welding adopting the phased temperature control.

\* \* \* \* \*